United States Patent
Jung (10) Patent No.: US 7,187,414 B2
(45) Date of Patent: Mar. 6, 2007

(54) CIRCUIT FOR STABILIZING HIGH TENSION VOLTAGE OF CRT, AND METHOD THEREOF

(75) Inventor: Chang-joo Jung, Gyunggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 580 days.

(21) Appl. No.: 10/241,559

(22) Filed: Sep. 12, 2002

(65) Prior Publication Data

US 2003/0052545 A1   Mar. 20, 2003

(30) Foreign Application Priority Data

Sep. 14, 2001   (KR) ............................... 2001-56670
May 21, 2002   (KR) ............................... 2002-28023

(51) Int. Cl.
*H04N 5/68*   (2006.01)

(52) U.S. Cl. ..................... 348/377; 348/379; 348/805

(58) Field of Classification Search ............... 348/805, 348/377, 378, 379; 315/389, 370–371, 383, 315/387, 395, 381, 403; 313/364, 446
See application file for complete search history.

(56) References Cited

U.S. PATENT DOCUMENTS 5,394,188 A * 2/1995 Ohira ........................ 348/327
5,920,157 A * 7/1999 Shin et al. .................. 315/389
6,541,927 B2 * 4/2003 Yamashita ................... 315/381
6,563,496 B1 * 5/2003 Sakurai ....................... 348/379
6,690,339 B2 * 2/2004 Burkhardt et al. ............ 345/10

FOREIGN PATENT DOCUMENTS

| JP | 05-199425 | 8/1993 |
| JP | 10-336475 | 12/1998 |
| JP | 2000-316104 | 11/2000 |

OTHER PUBLICATIONS

Japanese Patent Application No. 2002-265843 dated Jan. 17, 2006.

* cited by examiner

*Primary Examiner*—Trang U. Tran
(74) *Attorney, Agent, or Firm*—Sughrue Mion, PLLC (57) ABSTRACT

Disclosed is a circuit for stabilizing a high tension voltage of a CRT and a method thereof. A feedback unit receives a cutoff voltage from the CRT. A compensating unit calculates a variation quantity of the cutoff voltage on the basis of the cutoff voltage from the feedback unit. The variation quantity of the cutoff voltage is compared with a high tension voltage compensation data stored in a storing unit according to the variation quantity of the cutoff voltage. Accordingly, the circuit for stabilizing the high tension voltage of the CRT and the method thereof can overcome inaccuracy of the high tension voltage compensation due to delay, and cut down the production cost by removing an ABL circuit and a high tension voltage compensating capacitor. Since the ABL circuit is not used, it is also possible to perform partial compensation according to an alternating current variation quantity.

16 Claims, 7 Drawing Sheets

CIRCUIT FOR STABILIZING HIGH TENSION VOLTAGE OF CRT, AND METHOD THEREOF

BACKGROUND OF THE INVENTION

1. Field of the Invention

The present invention relates to a circuit for stabilizing a high tension voltage of a cathode ray tube (CRT) and a method thereof, and more particularly, to a circuit for stabilizing a high tension voltage of a CRT which has a function of compensating for a feed-forward extra high tension (EHT) voltage, and a method thereof. The present invention is based on Korean Patent Application Nos. 2001-56670 and 2002-28023, which are incorporated herein by reference.

2. Description of the Related Art

In general, a CRT applies a high tension voltage, namely a few tens of kV of tension to an anode, and accelerates electrons so that an electron beam emitted from a cathode can crash into a screen coated with phosphor at a high speed. Accordingly, an electron beam current, namely a cathode current runs from the anode to the cathode. While a screen image is being scanned, the direct current electron beam is modulated by an RGB image signal. Here, the modulated electron beam generates variations in the strength and weakness of the electron beam crashing into the phosphor of the screen, thereby displaying a color screen.

Since the image signal is modulated and displayed on the high tension current in the CRT, the variations of the high tension voltage influences the brightness and contrast of the screen. Therefore, the high tension voltage must be stabilized to improve quality of image.

The high tension voltage of the CRT is obtained by rectifying a flyback transformer (FBT) pulse. However, the high tension voltage power has a poor voltage variation ratio, and the high tension voltage is changed in every variation of the images. Accordingly, variations of an amplitude of a raster and deviations of a convergence and focus may take place, or the power voltage of the respective units obtained by using the FBT pulse may be changed, which results in unstable operations of the CRT. Therefore, a high tension voltage generating circuit needs measures for stabilizing a high tension voltage.

Figure 1:
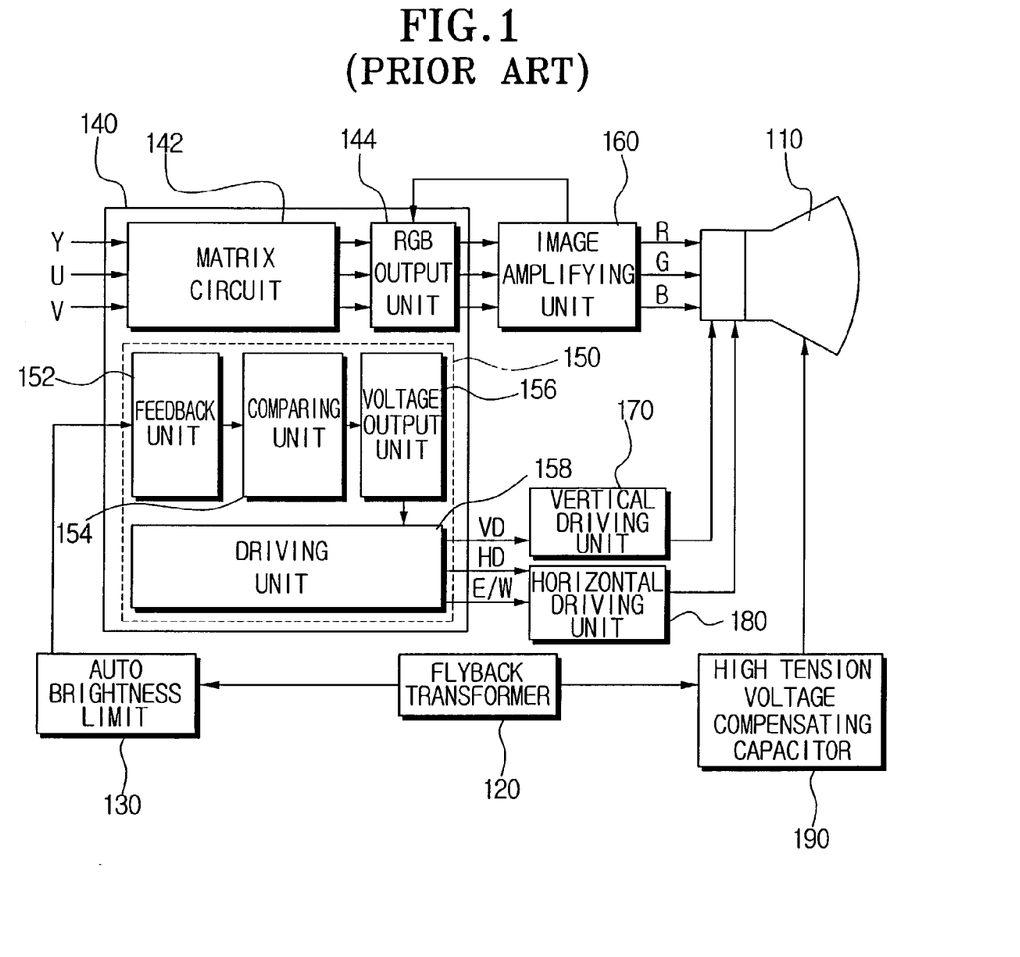
FIG. 1 is a block diagram illustrating a conventional circuit for stabilizing a high tension voltage.

In the conventional art, in order to stabilize the high tension voltage, the high tension voltage compensation is performed by using the feedback voltage inputted from an FBT to an auto brightness limit (ABL). FIG. 1 is a block diagram illustrating a conventional circuit for stabilizing a high tension voltage.

Referring to FIG. 1, the conventional circuit 150 for stabilizing the high tension voltage includes a feedback unit 152, a comparing unit 154, a voltage output unit 156 and a driving unit 158.

The feedback unit 152 receives a voltage of an FBT 120 through an ABL 130 according to variations of the high tension voltage of a CRT 110. The comparing unit 154 extracts a variation quantity of the voltage from the feedback unit 152. The voltage output unit 156 outputs a voltage having the compensated high tension voltage on the basis of the voltage variation quantity from the comparing unit 154. The driving unit 158 outputs the compensated high tension voltage from the voltage output unit 156 to a vertical driving unit 170 and a horizontal driving unit 180. Here, the compensated high tension voltage is an E/W signal inputted to the horizontal driving unit 180.

Figure 2A:
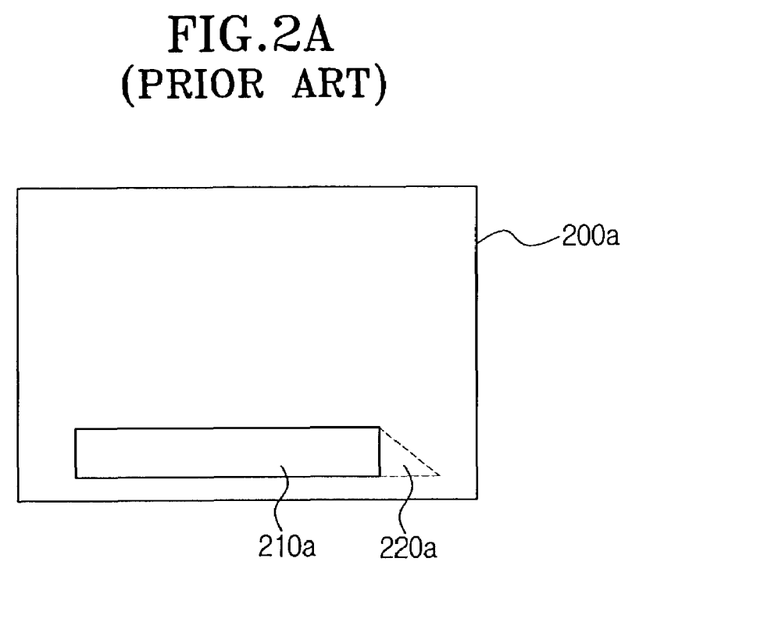
FIGS. 2A and 2B are views illustrating an exemplary image distortion in the conventional CRT.
Figure 2B:
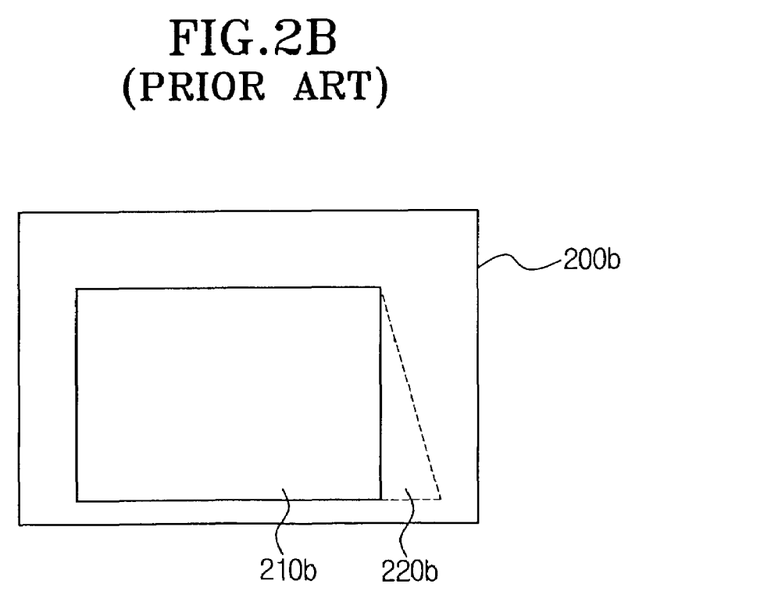

However, with the conventional circuit for stabilizing the high tension voltage, the CRT has an image distortion around a boundary between a bright region and a dark region of the screen by the influence of the unstable compensation for high tension voltage. FIGS. 2A and 2B show the image distortion occurring in the conventional CRT. FIGS. 2A and 2B show image distortion areas 220a, 220b occurring around the boundary between the bright areas 200a, 200b and the dark areas 210a, 210b. Here, position and size of the white varies depending on the factors like image display device type, location of the image display device and size of the white bar, etc. Accordingly, complete compensation is possible when the compensation quantity of high tension voltage is varied appropriately. The conventional circuit for stabilizing the high tension voltage, however, has a problem in that it performs a fixed compensation irrespective of such factors.

On the other hand, a YUV signal is transformed into an RGB signal in a matrix circuit 142, and inputted to an image amplifying unit 160. The image amplifying unit 160 amplifies the inputted RGB signal, and outputs it to the CRT. The RGB signal amplified in the image amplifying unit 160 is fed back to a video matrix chip 140, and used to adjust white balance. In addition, a high tension voltage compensating capacitor 190 serves to reduce variations of the high tension voltage inputted from the FBT to the CRT.

However, the conventional circuit has a disadvantage in that an input signal may be delayed by the ABL circuit, because the variations of the high tension voltage are fed back through the ABL circuit. Such a signal delay is one of the main factors having a negative effect on precise phase magnitude compensation. Moreover, alternating current (AC) elements are almost removed through a low pass filter of the ABL circuit, and thus partial compensation is hard to perform.

On the other hand, when the high tension voltage compensating capacitor is used to solve the foregoing problem, it reduces the variations of the high tension voltage, but increases expenses. Further, an active correction of image is not possible as the user is not provided with the means to enable him/her to directly correct the image distortion occurring due to inaccurate compensation of high tension voltage.

SUMMARY OF THE INVENTION

It is, therefore, an object of the present invention to provide a circuit for stabilizing a high tension voltage of a CRT and a method thereof which can overcome inaccuracy of phase magnitude compensation and partial compensation due to delay, and which can cut down the production cost.

It is another object of the present invention to provide an image display device having a means to enable a user to directly correct inaccuracy of phase magnitude compensation and partial compensation occurring due to delay.

To achieve the above object, there is provided a circuit for stabilizing a high tension voltage according to the present invention, including a feedback unit for receiving a cutoff voltage from a monitor; a storing unit for storing high tension voltage compensation data according to a variation quantity of the cutoff voltage; and a compensating unit for compensating for the high tension voltage by comparing the variation quantity of the cutoff voltage with the high tension voltage compensation data.

The compensating unit includes a comparing unit for outputting a high tension voltage compensation quantity by comparing the variation quantity of the cutoff voltage with the high tension voltage compensation data; a partial compensating unit for comparing the variation quantity of alternating current of the cutoff voltage with the high tension voltage compensation data, and outputting a first compensation quantity for a slope of the cutoff voltage; and a voltage output unit for receiving the high tension voltage compensation quantity and/or the first compensation quantity, and outputting a compensated voltage.

Further provided is a compensation quantity providing unit for providing the compensating unit with a second compensation quantity for a slope of the cutoff voltage inputted from a user. The partial compensating unit performs partial compensation by applying first and second compensation quantities in accordance with an externally-inputted control signal, either sequentially or simultaneously.

The high tension voltage compensation data comprises a phase magnitude compensation data having a phase magnitude adjustment quantity defined according to a direct current variation quantity of the cutoff voltage, and/or a partial compensation data having a slope compensation quantity of the cutoff voltage defined according to the alternating current variation quantity of the cutoff voltage.

In order to accomplish the other object, an image display device according to the present invention includes: a circuit for stabilizing high tension voltage having a feedback unit for receiving a cutoff voltage fed back from a CRT, a storing unit for storing a high tension voltage data in accordance with variation quantity of the cutoff voltage, a compensating unit for compensating high tension voltage by comparing the variation quantity of the cutoff voltage with the high tension voltage compensating data, and a compensation quantity providing unit for providing the compensating unit with a first compensating quantity for a slope of the cutoff voltage inputted from a user; a user interfacing unit for receiving the first compensation quantity from the user and providing the circuit for stabilizing high tension voltage with the received first compensation quantity; and an on screen display (OSD) generating unit for generating an input screen of the first compensation quantity in the OSD form, according to the selection of the user. The compensating unit performs image distortion compensation by applying the first compensation quantity based on an externally-inputted control signal and a second compensation quantity according to a comparison result of the variation quantity of the cutoff voltage and the high tension voltage compensation data, either sequentially or simultaneously.

The compensating unit comprises: a comparing unit for comparing the variation quantity of the cutoff voltage with the high tension voltage compensation data, and outputting a high tension voltage compensation quantity; a partial compensating unit for comparing an alternating current variation quantity of the cutoff voltage with the high tension voltage compensation data, and outputting a second compensation quantity of a slope of the cutoff voltage; and a voltage outputting unit for receiving the high tension voltage compensation quantity, the first compensation quantity and/of the second compensation quantity, and outputting a compensated voltage.

The high tension voltage compensation data comprises a phase magnitude compensation data having a phase magnitude adjustment quantity defined according to the direct current variation quantity of the cutoff voltage, and/or a partial compensation data having a slope compensation quantity of the cutoff voltage defined according to the alternating current variation quantity of the cutoff voltage.

According to the present invention, a method for stabilizing a high tension voltage according to the present invention includes the steps of: (a) receiving a cutoff voltage from a CRT; (b) calculating a variation quantity of the cutoff voltage; and (c) compensating for the high tension voltage by comparing the variation quantity of the cutoff voltage with the previously-stored high tension voltage compensation data.

Further provided are the steps of: (d) receiving a second compensation quantity for a slope of the cutoff voltage from a user; and (e) changing the slope of the cutoff voltage based on the second compensation quantity.

The step (c) comprises the steps of: (c1) outputting a high tension voltage compensation quantity by comparing the variation quantity of the cutoff voltage with the high tension voltage compensation data; and (c2) receiving the high tension voltage compensation quantity, and outputting a compensated voltage.

The step (c1) comprises the steps of: dividing the variation quantity of the cutoff voltage into a direct current variation quantity and an alternating current variation quantity; outputting a high tension voltage compensation quantity for a phase magnitude by comparing the direct current variation quantity with the high tension voltage compensation data; and outputting a first compensation quantity for partial compensation by comparing the alternating current variation quantity with the high tension voltage compensation data.

The high tension voltage compensation data comprises a phase magnitude compensation data having a phase magnitude adjustment quantity defined according to the direct current variation quantity of the cutoff voltage, and/or a partial compensation data having a slope compensation quantity of the cutoff voltage defined according to the alternating current variation quantity of the cutoff voltage.

In accordance with the present invention, the circuit for stabilizing the high tension voltage of the CRT and the method thereof can overcome inaccuracy of the high tension voltage compensation due to delay by using the cutoff voltage of the CRT during the high tension voltage compensation, and can cut down the production cost by removing an ABL circuit and a high tension voltage compensating capacitor. Further as the user can directly perform partial compensation, the high tension voltage can be varied in consideration of the degree of image distortions and demands of the user.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
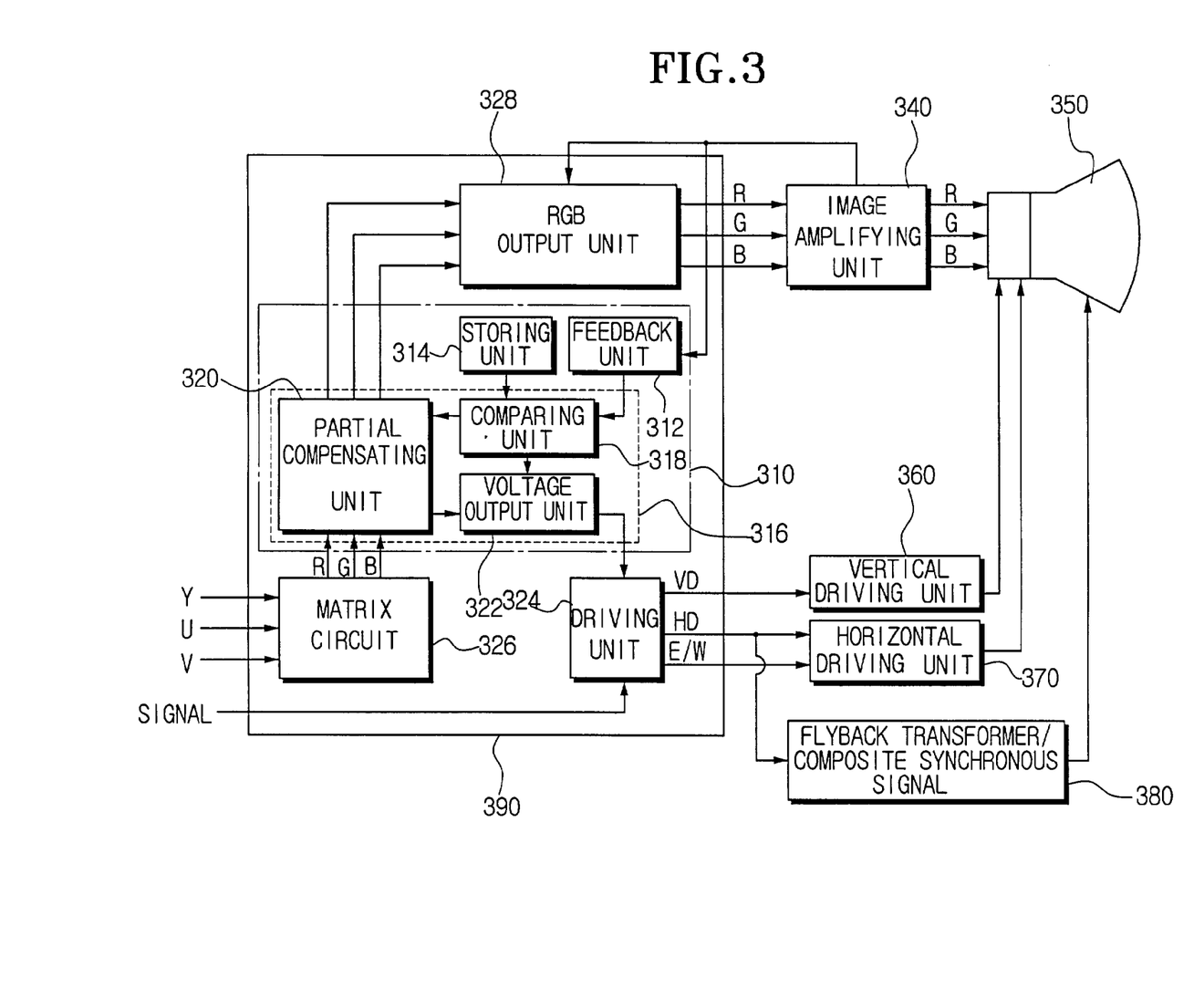
FIG. 3 is a block diagram illustrating a circuit for stabilizing a high tension voltage of a CRT in accordance with a first preferred embodiment of the present invention.
Figure 4:
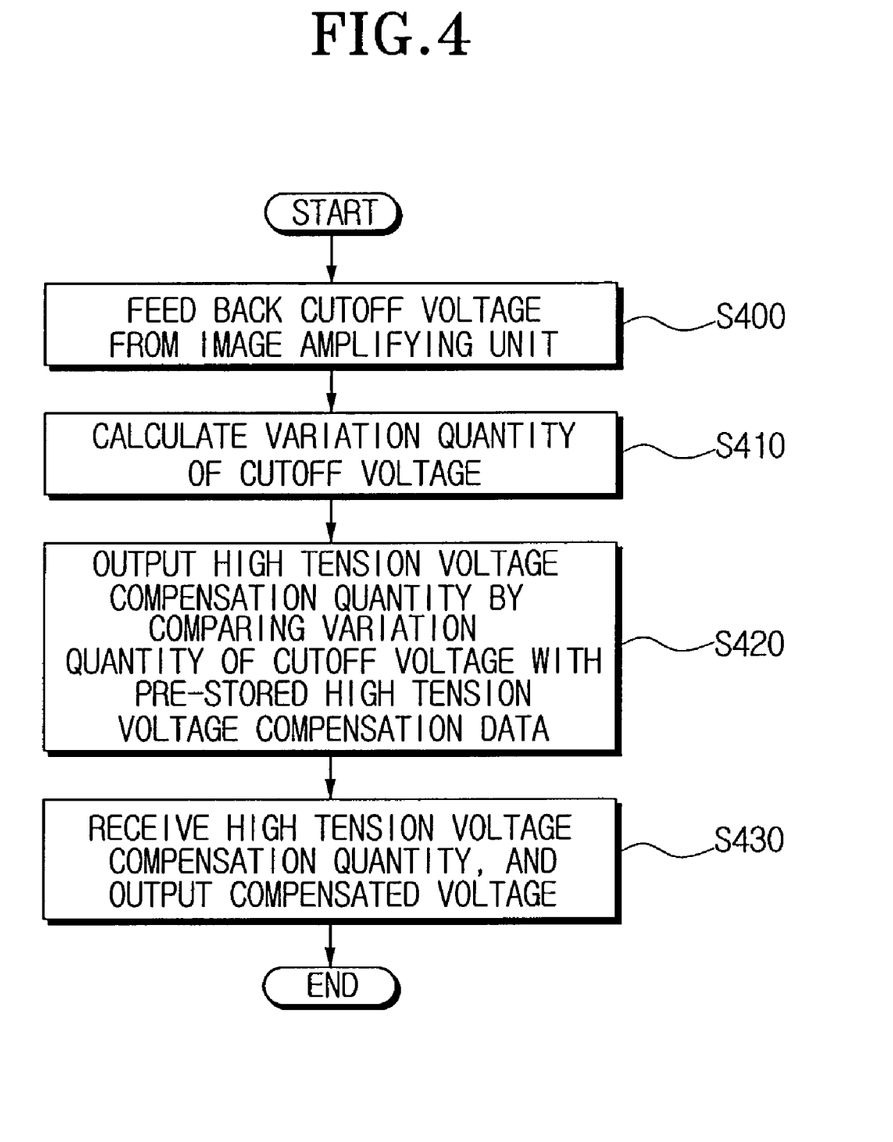
FIG. 4 is a flowchart illustrating a method for stabilizing a high tension voltage of a CRT in accordance with the first preferred embodiment of the present invention.

FIG. 3 is a block diagram illustrating a circuit for stabilizing a high tension voltage of a CRT in accordance with the preferred embodiment of the present invention, and FIG. 4 is a flowchart illustrating a method for stabilizing a high tension voltage of a CRT in accordance with the preferred embodiment of the present invention.

Referring to FIGS. 3 and 4, the circuit 310 for stabilizing the high tension voltage of the CRT includes a feedback unit 312, a storing unit 314 and a compensating unit 316.

The feedback unit 312 receives a cutoff voltage from an image amplifying unit 340 (S400). Here, the feedback unit 312 can receive the cutoff voltage from the CRT. However, in order to improve accuracy of the feedback voltage and prevent delay, it is more preferable that the feedback unit 312 receives the cutoff voltage from the image amplifying unit 340.

The storing unit 314 stores a high tension voltage compensation data according to a variation quantity of the cutoff voltage. The high tension voltage compensation data stored in the storing unit 314 includes a phase magnitude compensation data having a phase magnitude adjustment quantity defined according to a direct current variation quantity of the cutoff voltage, and a partial compensation data having a voltage slope variation quantity defined according to an alternating current variation quantity of the cutoff voltage.

The compensating unit 316 compensates for the high tension voltage by comparing the variation quantity of the cutoff voltage with the high tension voltage compensation data (S410–S430). The variation quantity of the cutoff voltage inputted to the compensating unit 316 has direct current elements and alternating current elements. The compensating unit 316 includes a comparing unit 318, a partial compensating unit 320 and a voltage output unit 322.

The comparing unit 318 calculates the variation quantity of the cutoff voltage from the cutoff voltage from the feedback unit 312 (S410), and outputs a high tension voltage compensation quantity by comparing the variation quantity of the cutoff voltage with the high tension voltage compensation data stored in the storing unit 314 (S420). Here, the comparing unit 318 preferably outputs the high tension voltage compensation quantities for the direct current and alternating current. The partial compensating unit 320 receives the high tension voltage compensation quantity for the alternating current from the comparing unit 318, and performs partial compensation. Here, the partial compensation is executed by controlling a slope of the feedback voltage. The voltage output unit 322 receives the high tension voltage compensation quantity for the direct current from the comparing unit 18, and outputs a voltage having a compensated phase magnitude (S430).

The voltage outputted from the voltage output unit 322 is transmitted to the driving unit 324. The driving unit 324 outputs a vertical scanning signal VD and a horizontal scanning signal HD respectively to a vertical driving unit 360 and a horizontal driving unit 370. The driving unit 324 inputs the voltage E/W having the compensated vertical and horizontal phase magnitudes to the horizontal driving unit 370. On the other hand, an FBT 380 receives a pulse of a flyback period of the horizontal scanning signal HD from the horizontal driving unit 370, transforms the pulse into a high tension voltage, and supplies it to the CRT 350.

A video chip 390 includes the circuit 310 for stabilizing the high tension voltage, the driving unit 324, a matrix circuit 326 and an RGB output unit 328.

The matrix circuit 326 transforms an input YUV signal into an RGB signal, and outputs the RGB signal to the RGB output unit 328 via the partial compensation unit 320. The RGB output unit 328 outputs the RGB signal to the image amplifying unit 340. The image amplifying unit 340 amplifies the input RGB signal, and outputs the amplified signal to the CRT 350. The cutoff voltage is transmitted from the image amplifying unit 340 to the RGB output unit 328 and the feedback unit 312. The cutoff voltage transmitted to the RGB output unit 328 is used to adjust white balance.

Figure 5:
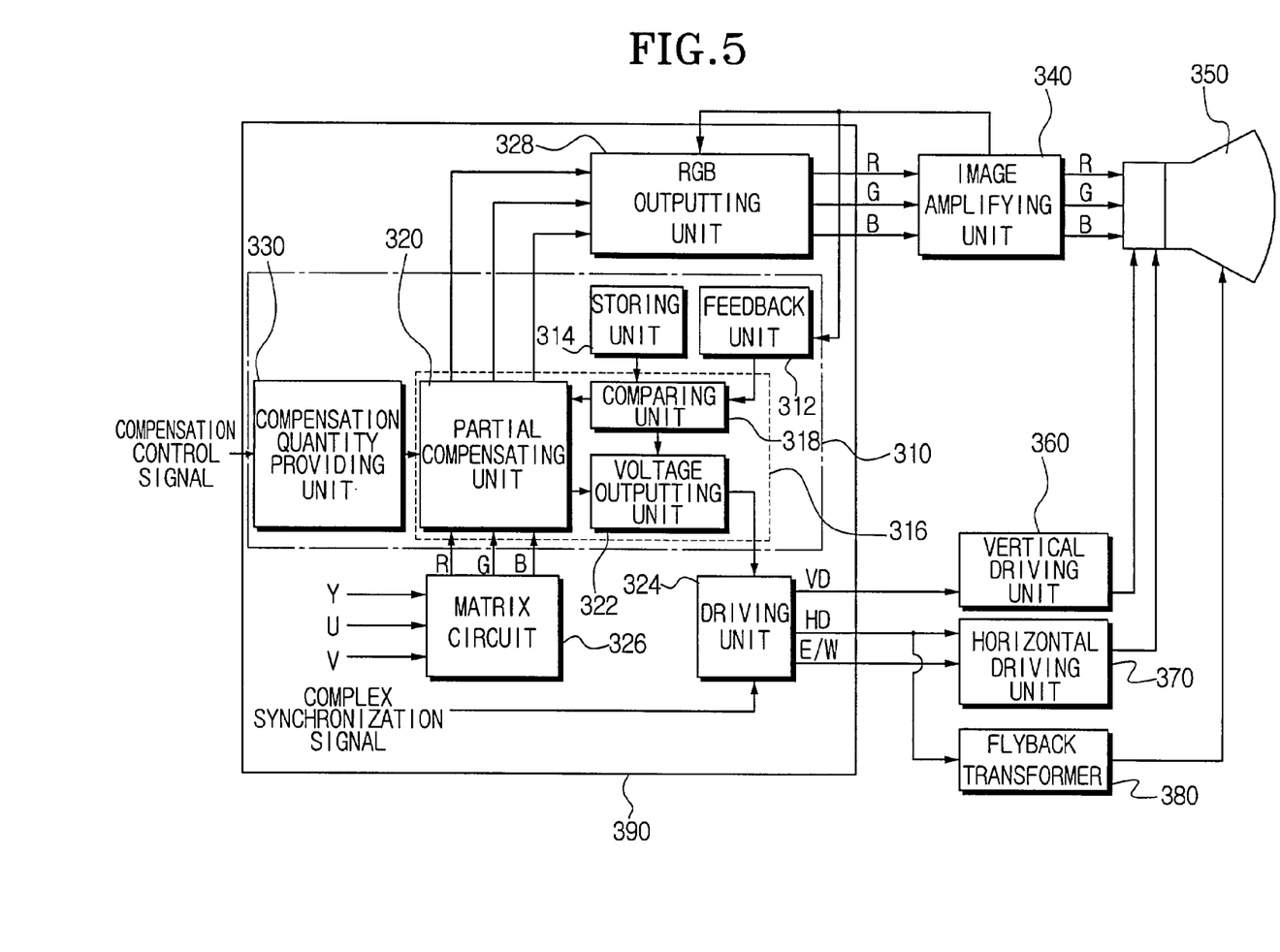
FIG. 5 is a block diagram illustrating a structure of a circuit for stabilizing a high tension voltage in accordance with a second preferred embodiment of the present invention.

FIG. 5 is a block diagram showing the structure of the circuit for stabilizing the high tension voltage in accordance with another preferred embodiment of the present invention.

Referring to FIG. 5, the circuit 310 for stabilizing high tension voltage of CRT includes a feedback unit 312, a storing unit 314, a compensating unit 316 and a compensation quantity providing unit 330.

Description of the functions of the feedback unit 312 and the storing unit 314 will be omitted, as they are described above with reference to FIG. 4.

The compensation quantity providing unit 330 receives a compensation control signal with respect to an image distortion from a user, and outputs the received signal to the partial compensating unit 320. Here, although the compensation quantity providing unit 330 is depicted as being formed in the circuit 310 for stabilizing high tension voltage, the compensation quantity providing unit 330 can also be provided separately. As the user inputs data about location and size of the white background through a remote controller (not shown) or through an input portion provided at an image display device such as a television which has the circuit 310 for stabilizing high tension voltage according to the present invention, the compensation quantity for such inputted data is inputted to the compensation quantity providing unit 330 in the form of an electrical signal.

Figure 6:
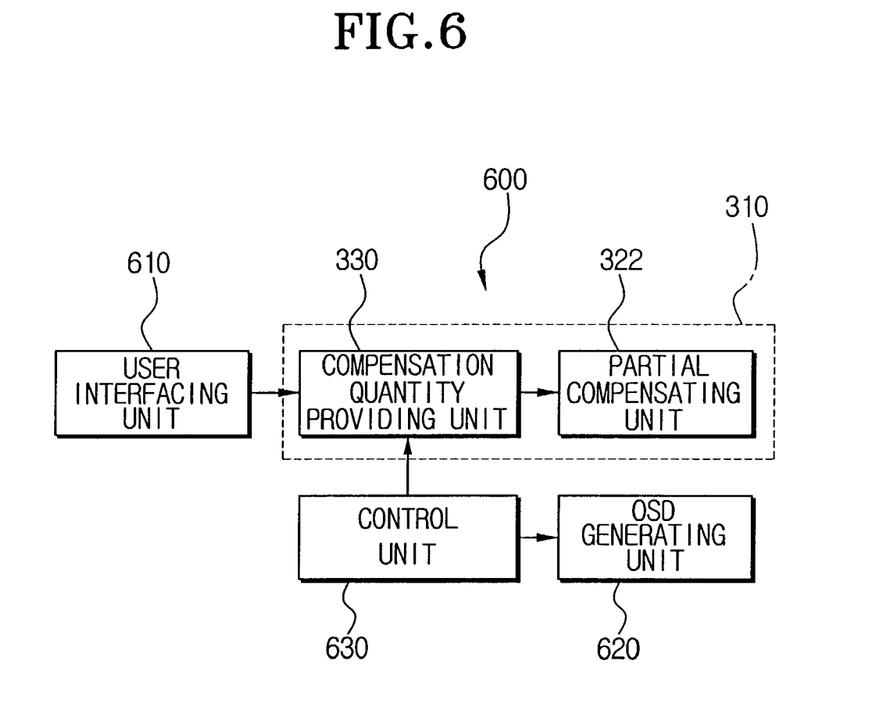
FIG. 6 is a block diagram illustrating a structure of an image display device having the circuit for stabilizing high tension voltage in accordance with the present invention.
Figure 7:
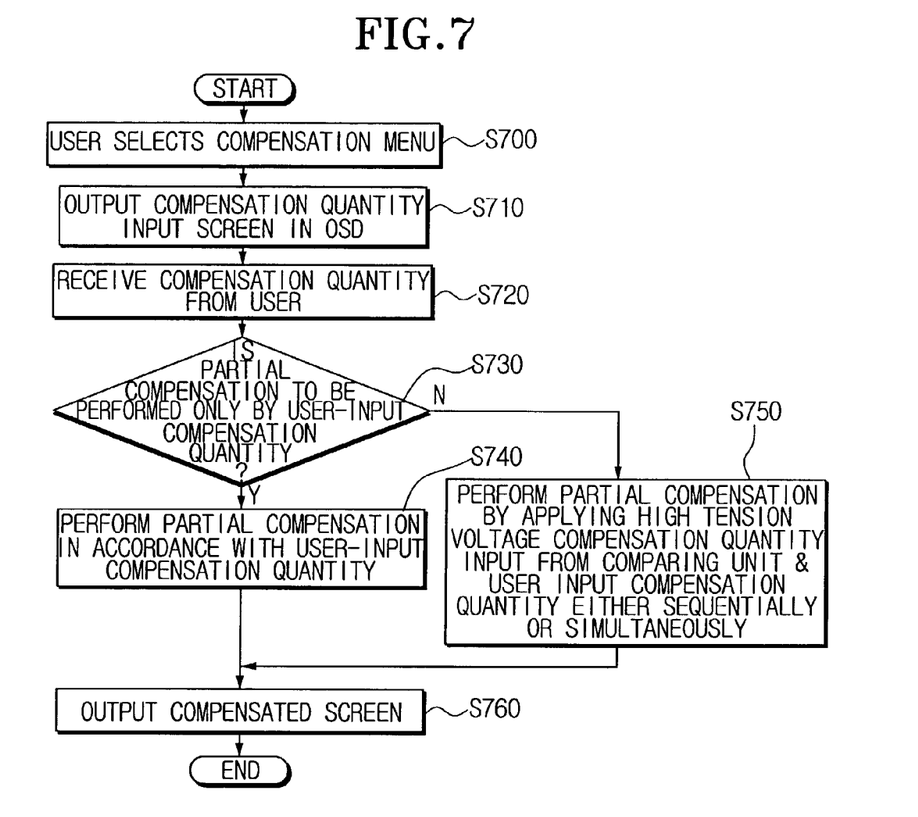
FIG. 7 is a flowchart illustrating a method for stabilizing a high tension voltage in accordance with the second preferred embodiment of the present invention.

FIG. 6 is a block diagram showing the structure of the image display device 600 having the circuit 310 for stabilizing the high tension voltage according to the present invention, and FIG. 7 is a flowchart showing a method for stabilizing high tension voltage according to the present invention.

Referring to FIGS. 6 and 7, the image display device 600 includes a circuit 310 for stabilizing high tension voltage, a user interfacing unit 610, an on screen display (OSD) generating unit 620 and a control unit 630.

Description of the structure and operation of the circuit 310 for stabilizing high tension voltage will be omitted, as the same are identical to those described above with reference to FIG. 5.

Likewise, FIG. 6 shows the essential parts of the high tension voltage stabilizing circuit 310, especially the parts for compensating for the high tension voltage based on the compensation quantity inputted by the user, while omitting the other parts as much as possible.

When the blurring areas 220a, 220b are generated around the boundary between the white background 200a, 200b and the black portion 210a, 210b of the text character, the user selects a compensation menu through a remote controller (not shown) or through an input portion provided at an image display device 600, such as a television having the circuit 310 according to the present invention (step S700). As the user selects the compensation menu, the control unit 630 drives the OSD generating unit 620 to output the input screen of the compensation quantity as the OSD (step S710).

Figure 8:
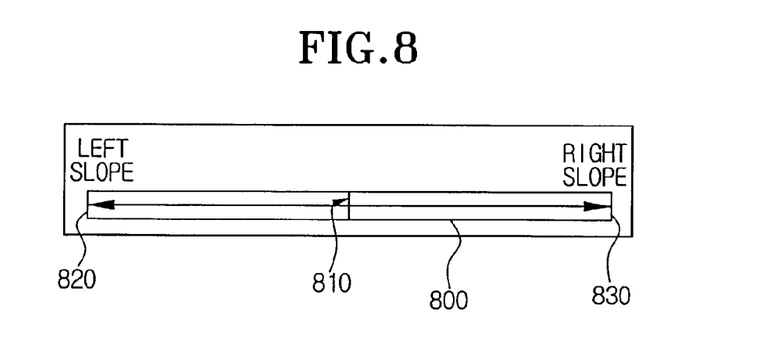
FIG. 8 is a view illustrating an exemplary compensation quantity input screen output to the image display device.

FIG. 8 shows one example of the input screen of the compensation quantity. The compensation quantity input screen includes a long slide bar 800, a compensation quantity adjusting bar 810 positioned in the long slide bar 800 and adjustment limits 820, 830 of the slopes of the blurring areas 220a, 220b. The user inputs the compensation quantity through input means such as the remote controller by moving the compensation quantity adjusting bar 810 on the compensation quantity input screen (step S720).

The user interfacing unit 610 receives from the user the compensation signals indicative of the quantity of compensation for the position and size of the white background, and provides the compensation quantity providing unit 330 with the received compensation signals. In this situation, the user interfacing unit 610 transforms the compensation signals inputted by the user into a signal recognizable by the partial compensating unit 322, i.e., into compensation quantity.

The control unit 630 checks to see whether the partial compensation is set to be performed only by the compensation quantity inputted by the user (step S730), and controls the partial compensation of the partial compensating unit 322. When the partial compensation is set to be performed only by the compensation quantity inputted by the user, the partial compensating unit 322 performs partial compensation without using the compensation quantity for high tension voltage that is inputted from the comparing unit 318 (step S740). Alternatively, the comparing unit 318 can be controlled not to input compensation quantity for high tension voltage to the partial compensating unit 322.

If the partial compensation is set to be performed both by the user input compensation quantity and by the compensation quantity for high tension voltage inputted from the comparing unit 318, the partial compensating unit 322 performs partial compensation by order of partial compensation by the compensation quantity for high tension voltage and then by the partial compensation by the user input compensation quantity, sequentially (step S750). Alternatively, the partial compensating unit 322 can perform partial compensation by simultaneously applying the user input compensation quantity and the compensation quantity for high tension voltage inputted from the comparing unit 318.

Meanwhile, if the user selects the compensation menu and inputs the compensation quantity after the partial compensation has been performed with the compensation quantity for high tension voltage inputted from the comparing unit 318, the partial compensating unit 322 can be constructed to perform partial compensation in accordance with an input of compensation quantity.

When the partial compensation is performed by the user input compensation quantity, the compensated image is output to the image display device 300 (step S760).

In accordance with the present invention, the circuit for stabilizing the high tension voltage of the CRT and the method thereof can overcome inaccuracy of the high tension voltage compensation due to delay by using the cutoff voltage of the CRT during the high tension voltage compensation, and can cut down the production cost by removing an ABL circuit and a high tension voltage compensating capacitor. Since the ABL circuit is not used, it is also possible to perform the partial compensation according to the alternating current variation quantity. Further, as the user can directly adjust the degree of partial compensation, variations of high tension voltage can be made in full consideration of degree of image distortion and demands of the user.

While the invention has been shown and described with reference to preferred embodiments thereof, it will be understood by those skilled in the art that various changes in form and details may be made therein without departing from the spirit and scope of the invention as defined by the appended claims.

What is claimed is:

1. A circuit for stabilizing a high tension voltage, comprising:
   a feedback unit for receiving a cutoff voltage from an image amplifying unit of a monitor;
   a storing unit for storing high tension voltage compensation data according to a variation quantity of the cutoff voltage; and
   a compensating unit for compensating for the high tension voltage by comparing the variation quantity of the cutoff voltage with the high tension voltage compensation data.

2. A circuit for stabilizing a high tension voltage, comprising:
   a feedback unit for receiving a cutoff voltage from an image amplifying unit of a monitor;
   a storing unit for storing high tension voltage compensation data according to a variation quantity of the cutoff voltage; and
   a compensating unit for compensating for the high tension voltage by comparing the variation quantity of the cutoff voltage with the high tension voltage compensation data,
   wherein the compensating unit comprises:
      a comparing unit for outputting a high tension voltage compensation quantity by comparing the variation quantity of the cutoff voltage with the high tension voltage compensation data;
      a partial compensating unit for comparing the variation quantity of alternating current of the cutoff voltage with the high tension voltage compensation data, and outputting a first compensation quantity for a slope of the cutoff voltage; and
      a voltage output unit for receiving at least one of the high tension voltage compensation quantity and the first compensation quantity, and outputting a compensated voltage.

3. The circuit of claim 2, further comprising a compensation quantity providing unit for providing the compensating unit with a second compensation quantity for a slope of the cutoff voltage inputted from a user, wherein the partial compensating unit performs partial compensation by applying first and second compensation quantities in accordance with an externally-inputted control signal, either sequentially or simultaneously.

4. The circuit of claim 2, wherein the high tension voltage compensation data includes at least one of a phase magnitude compensation data having a phase magnitude adjustment quantity defined according to a direct current variation quantity of the cutoff voltage and a partial compensation data having a slope compensation quantity of the cutoff voltage defined according to the alternating current variation quantity of the cutoff voltage.

5. The circuit of claim 3, wherein the high tension voltage compensation data includes at least one of a phase magnitude compensation data having a phase magnitude adjustment quantity defined according to a direct current variation quantity of the cutoff voltage and a partial compensation data having a slope compensation quantity of the cutoff voltage defined according to the alternating current variation quantity of the cutoff voltage.

6. An image display device, comprising:
a circuit for stabilizing high tension voltage comprising:
a feedback unit for receiving a cutoff voltage fed back from a display monitor;
a storing unit for storing a high tension voltage data in accordance with variation quantity of the cutoff voltage;
a compensating unit for compensating high tension voltage by comparing the variation quantity of the cutoff voltage with the high tension voltage compensating data; and
a compensation quantity providing unit for providing the compensating unit with a first compensating quantity for a slope of the cutoff voltage inputted from a user;
a user interfacing unit for receiving the first compensation quantity from the user and providing the circuit for stabilizing high tension voltage with the received first compensation quantity; and
an on screen display (OSD) generating unit for generating an input screen of the first compensation quantity in the OSD form, according to the selection of the user, wherein
the compensating unit performs image distortion compensation by applying the first compensation quantity based on an externally-inputted control signal and a second compensation quantity according to a comparison result of the variation quantity of the cutoff voltage and the high tension voltage compensation data, either sequentially or simultaneously.

7. The circuit of claim 6, wherein the compensating unit comprises:
a comparing unit for comparing the variation quantity of the cutoff voltage with the high tension voltage compensation data, and outputting a high tension voltage compensation quantity;
a partial compensating unit for comparing an alternating current variation quantity of the cutoff voltage with the high tension voltage compensation data, and outputting a second compensation quantity of a slope of the cutoff voltage; and
a voltage outputting unit for receiving at least one of the high tension voltage compensation quantity, the first compensation quantity and the second compensation quantity, and outputting a compensated voltage.

8. The circuit of claim 6, wherein the display monitor is a CRT.

9. The circuit of claim 6, wherein the high tension voltage compensation data includes at least one of a phase magnitude compensation data having a phase magnitude adjustment quantity defined according to the direct current variation quantity of the cutoff voltage and a partial compensation data having a slope compensation quantity of the cutoff voltage defined according to the alternating current variation quantity of the cutoff voltage.

10. The circuit of claim 7, wherein the high tension voltage compensation data includes at least one of a phase magnitude compensation data having a phase magnitude adjustment quantity defined according to the direct current variation quantity of the cutoff voltage and a partial compensation data having a slope compensation quantity of the cutoff voltage defined according to the alternating current variation quantity of the cutoff voltage.

11. A method for stabilizing a high tension voltage, comprising the steps of:
(a) receiving a cutoff voltage from an image amplifying unit of a display monitor;
(b) calculating a variation quantity of the cutoff voltage; and
(c) compensating for the high tension voltage by comparing the variation quantity of the cutoff voltage with previously-stored high tension voltage compensation data.

12. The method of claim 11, wherein (c) comprises the steps of:
(c1) outputting a high tension voltage compensation quantity by comparing the variation quantity of the cutoff voltage with the high tension voltage compensation data; and
(c2) receiving the high tension voltage compensation quantity, and outputting a compensated voltage.

13. The method of claim 11, wherein the display monitor is a CRT.

14. A method for stabilizing a high tension voltage, comprising the steps of:
(a) receiving a cutoff voltage from an image amplifying unit of a display monitor;
(b) calculating a variation Quantity of the cutoff voltage; and
(c) compensating for the high tension voltage by comparing the variation quantity of the cutoff voltage with previously-stored high tension voltage compensation data,
wherein (c) comprises the steps of:
(c1) outputting a high tension voltage compensation quantity by comparing the variation quantity of the cutoff voltage with the high tension voltage compensation data; and
(c2) receiving the high tension voltage compensation quantity, and outputting a compensated voltage, and
wherein (c1) comprises the steps of:
dividing the variation quantity of the cutoff voltage into a direct current variation quantity and an alternating current variation quantity;
outputting a high tension voltage compensation quantity for a phase magnitude by comparing the direct current variation quantity with the high tension voltage compensation data; and
outputting a first compensation quantity for partial compensation by comparing the alternating current variation quantity with the high tension voltage compensation data.

15. A method for stabilizing a high tension voltage, comprising the steps of:

(a) receiving a cutoff voltage from an image amplifying unit of a display monitor;
(b) calculating a variation Quantity of the cutoff voltage; and
(c) compensating for the high tension voltage by comparing the variation quantity of the cutoff voltage with previously-stored high tension voltage compensation data,
wherein the high tension voltage compensation data includes at least one of a phase magnitude compensation data having a phase magnitude adjustment quantity defined according to the direct current variation quantity of the cutoff voltage and a partial compensation data having a slope compensation quantity of the cutoff voltage defined according to the alternating current variation quantity of the cutoff voltage.

16. A method for stabilizing a high tension voltage, comprising the steps of:
(a) receiving a cutoff voltage from an image amplifying unit of a display monitor;
(b) calculating a variation Quantity of the cutoff voltage;
(c) compensating for the high tension voltage by comparing the variation quantity of the cutoff voltage with previously-stored high tension voltage compensation data;
(d) receiving a second compensation quantity for a slope of the cutoff voltage from a user; and
(e) changing the slope of the cutoff voltage based on the second compensation quantity.

* * * * *